United States Patent Office

3,009,933
Patented Nov. 21, 1961

3,009,933
PROCESS FOR THE MANUFACTURE OF 9α,11β-DIHALOGENATED STEROIDS
Cecil H. Robinson, Clifton, N.J., assignor to Schering Corporation, Bloomfield, N.J., a corporation of New Jersey
No Drawing. Filed June 1, 1959, Ser. No. 817,079
13 Claims. (Cl. 260—397.3)

This invention relates to a novel method for halogenating a $\Delta^{9(11)}$-dehydro product so as to produce a 9α,11β-dihalogeno product. More particularly, this invention relates to a method for preparing 9,11-dihalogeno compounds of the pregnane and androstane series. By the term "pregnane and androstane series," I include those compounds containing one or more unsaturations in the A-ring as exemplified by systems such as 3-keto-$\Delta^4$; 3-keto-$\Delta^1$-5-allo; and 3-keto-$\Delta^{1,4}$; as well as 19-nor-3-keto-$\Delta^4$-analogs.

By virtue of my process I am able to simultaneously introduce halogen atoms at the 9 and 11-positions of a steroid by subjecting a $\Delta^{9,11}$-steroid to the action of a particular class of halogenating agents. The halogen atoms at C-9 and C-11 may be the same, for example, both may be chlorine or bromine, or they may be different. In the latter situation, the process is such that the more electronegative atom attaches to C-11 while the less electronegative (i.e. the more electropositive) atom attaches to C-9. Thus, when employing a reagent system which supplies both chlorine and fluorine ions, the product is a 9α-chloro-11β-fluoro substance. By my process, therefore, it is now possible to introduce fluorine directly to a double bond site in the molecule whereas heretofore it has always been necessary to go through an intermediate. For example, to introduce fluorine at a 9(11)- or 5(6)-double bond, it has heretofore been necessary to first form the epoxy derivative across the double bond, and then treat with hydrofluoric acid, forming the 9α-fluoro-11β-hydroxy or 5α-hydroxy-6β-fluoro compounds, respectively.

The halogenating agents, as described below, are of a conventional type. I have found, however, that by carrying out the dihalogenation process in a halogenated hydrocarbon such as methylene chloride, chloroform or carbon tetrachloride, and adding to the reaction mixture up to eighty equivalents (based on the amount of steroid used) of a basic agent such as pyridine the halogenation is directed specifically to the 9 and 11-positions of the requisite 9(11)-dehydro intermediate. For example, methylene groups which are in positions alpha to or allylic to a carbonyl group or which are allylic to an unsaturation often compete for the halogens. However, the "directive" action of the basic solvent medium of my process increases the yield and purity of the 9,11-dihalogenated product obtained thereby which is often close to theoretical quantity. Basic agents other than pyridine which may also be used in my process in conjunction with a halogenated hydrocarbon solvent are tertiary amines such as triethylamine and preferably aromatic tertiary amines such as dimethylaniline, lutidine, collidine and other alkyl substituted pyridines.

My process is valuable when it is desired to halogenate a steroid containing a 17-hydroxy group and particularly steroids of the androstane series. An androstane having a secondary hydroxy group at the 17-position, as exemplified by 4,9(11)-androstadiene-17β-ol-3-one, when halogenated in acetic acid such as with N-chlorosuccinimide and hydrogen chloride tends to 17-acetylate as well as to halogenate at 9 and 11, thereby producing a mixture of 9,11-dihalogeno-androstadiene-17β-ol-3-one and 9,11-dihalogeno-androstadiene-17β-acetoxy-3-one. On the other hand, when the aforementioned androstadiene is halogenated by the same reagent in carbon tetrachloride solution in the presence of about 1.1 molar equivalents of pyridine, almost theoretical quantities of the 9,11-dihalogeno-17β-hydroxy product are obtained. Analogously, androstanes having a 17-tertiary hydroxy group, such as 17α-methyl-4,9(11)-androstadiene-17β-ol-3-one in the presence of any strong acid tend to rearrange and/or dehydrate. Thus, when subjected to a commonly used halogenating medium such as acetic acid the above-mentioned androstadiene, in addition to halogenating at C-9 and C-11, also rearranges and dehydrates forming a mixture of products difficult to isolate and separate. When carbon tetrachloride-pyridine is used as the solvent medium for the same halogenating agent, the only reaction which takes place is halogenation at C-9 and C-11 producing high yields of 9α,11β-dihalogeno-17α-methyl-4-androstene-17β-ol-3-one.

17α-hydroxyprogesterones are also preferably halogenated by my process rather than in an acidic medium such as that using chlorine in acetic acid wherein competing dehydration and rearrangement reactions similar to those described above cause a mixture of products which are difficult to isolate and lower the yield of the desired product.

When halogenating pregnanes of the corticoid series such as 4,9(11)-pregnadiene-17α,21-diol-3,20-dione 21-acetate, my basic-halogenated hydrocarbon solvent medium is similarly valuable in view of the elimination of competing side reactions. For example, halogenation of the aforementioned pregnadiene with chlorine in acetic acetic acid gives some 9α,11β-dichloro-4-pregnene-17α,21-diol-3,20-dione 21-acetate but in a very poor yield, probably due to the formation of 2,6-dichloro-4,9(11)-pregnadiene derivative as well as some 2,6,9,11-tetrachloro-4-pregnene. However, when carbon tetrachloride is used as solvent and pyridine is added, according to my process, an almost theoretical quantity of 9α,11β-dichloro-4-pregene-17α,21-diol-3,20-dione 21-acetate is obtained.

Halogenating agents suitable for use in my process are:
(1) isoatomic molecular halogens such as chlorine or bromine, (2) molecular halogen donors such as the addition compounds pyridinium bromide perbromide, dioxane dibromide, iodobenzene dichloride and p-iodotoluene dichloride, (3) a heteroatomic molecular halogen as iodine monochloride, (4) a mixture of reagents comprising a positive halogen donor such as a molecular halogen or a compound such as N-chlorosuccinimide, N-bromoacetamide, N-bromosuccinimide, dimethyl-N,N-dibromohydantoin, and N-iodosuccinimide, together with a hydrogen halide possessing a halogen ion having an electronegativity equal to or greater than that of the above-mentioned positive halogen donor. Examples of such mixtures are hydrogen chloride and N-chlorosuccinimide, hydrogen chloride and chlorine, hydrogen fluoride and N-bromoacetamide, hydrogen bromide and N-bromoacetamide, hydrogen fluoride and N-iodosuccinimide and the like.

In the halogenation reaction, the halogenating agent may be considered as giving rise to positive halogen, i.e. electron-deficient halogen ion which attacks the 9-position as well as negative halogen, i.e. electron-rich halogen ion which attacks the 11-position. For example, molecular chlorine gives rise to positive chloronium ions and negative chloride ions. Thus, when the halogenating agent is one of the above-described isoatomic or heteroatomic halogen molecules, the molar quantity of positive halogen ion is necessarily equal to that of negative halogen ion. When according to my process, a steroid and an equivalent amount of an isoatomic or heteroatomic halogen molecule are allowed to react in a halogenated hydrocarbon solvent in the presence of a basic agent such as pyridine (preferably with approximately a molar equivalent of said basic agent), there is obtained a high yield of pure 9,11-dihalogeno steroid.

Homo-halogenation, that is, halogenation whereby the same halogen is introduced at C–9 and C–11 may be effected in the same manner as heterohalogenation by employing reagents such as the N-haloamides in admixture with a source of halide ion. In my process, the halide ion is preferably supplied by an anhydrous hydrohalic acid. When homo-halogenating (e.g. with N-chlorosuccinimide and hydrogen chloride), approximately theoretical quantities of halide ion are used whereas when hetero-halogenating (e.g. with N-chlorosuccinimide and hydrogen fluoride) large excesses of the hydrogen halide are advantageously used. When employing such mixtures of reagents, the usual molar quantity of basic agent used is approximately twice that of the hydrogen halide, which is hydrogen chloride and hydrogen fluoride respectively, in the aforementioned mixtures although a smaller quantity or an excess of the basic agent may be used as is shown in the attached examples.

It is apparent from the above, that there are a number of different, but equivalent methods by which the same compound may be prepared. For example, a $9\alpha,11\beta$-dichloro compound may be prepared by utilizing such reagents and combinations as (1) chlorine and pyridine in carbon tetrachloride, (2) N-chlorosuccinimide and hydrogen chloride in carbon tetrachloride and pyridine, and (3) p-iodotoluene dichloride in methylene chloride and pyridine.

My process whereby a 9,11-dehydro steroid is converted to $9\alpha,11\beta$-dihalogeno derivative is generally carried out in a substantially anhydrous halogenated hydrocarbon solvent such as carbon tetrachloride, chloroform and the like using a halogenating agent of the type described above in amounts preferably ranging from 1 to 1.2 equivalents per mole of steriod in the presence of a base such as pyridine in quantities ranging from 0.1 up to 80 molar equivalents of steriod present. The preferred molar quantity of basic agent used is from 1 to 5 per mole of molecular halogenating agent present or, when a mixture of reagents is used (such as N-chlorosuccinimide and hydrogen fluoride), on the quantity of hydrogen halide used. The reaction may be carried out at temperatures ranging from about $-40°$ C. to about $+50°$ C. preferably in the range of $-25°$ C. to $+25°$ C. for a period of time ranging from 30 minutes to 18 hours depending on the steroid and halogenating agent used. In general, it has been discovered that by my novel halogenation process, a steroid may be halogenated at the 9 and 11-positions in a shorter time and at lower temperatures than is normally needed by other processes whereby halogen is introduced at other points in the molecule.

In those instances wherein the halogenating agent is a mixture of an N-halogenoamide and a halide ion in the form of a hydrohalic acid it is somewhat surprising that the reaction proceeds as described above. N-haloamides are known to halogenate positions allylic to double bonds. However by this method in the presence of halide ion and a tertiary amine such as pyridine the reaction appears to promote saturation of the 9,11-bond with halogen. Furthermore, my process is preferably applied to pregnanes and androstanes possessing a 3-keto group of a 3-keto-$\Delta^4$; 3-keto-$\Delta^1$; 3-keto-$\Delta^{1,4}$-system. Even with these conjugated unsaturated systems, allylic halogenation does not take place but halogenation of the 9,11-bond occurs. Thus, my halogenation process selectively acts upon the $\Delta^{9,11}$-bond in the presence of other unsaturations.

By my process, I am able to produce dihalogeno analogs of 4-pregnene-$17\alpha,21$-diol-3,20-dione (Reichstein's Compound S) and of the $\Delta^1$-dehydro analog of Reichstein's Compound S as well as various nuclearly substituted analogs thereof. These compounds, which may be represented by the following general formula, include the 1,2-dihydro analogs thereof:

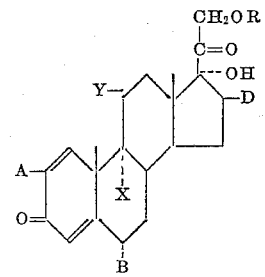

wherein A and B are H or methyl; D represents H, $\alpha$-lower alkyl, $\beta$-lower alkyl, $\alpha$-hydroxy, $\alpha$-lower alkanoyloxy; R represents H or a lower alkanoic acid radical, or an acid radical of an organic dibasic acid such as succinic or sulfobenzoic, or inorganic acid radicals such as phosphate or sulfate; X being chlorine, bromine or iodine and Y being fluorine, chlorine or bromine.

These compounds as described in copending application of Gould et al., Serial No. 743,492, filed June 20, 1958, are valuable anti-inflammatory agents.

In addition to the aforementioned corticoids, my process is applicable in the manufacture of 9,11-dihalogeno analogs of progesterone, $17\alpha$-acetoxyprogesterone and other related compounds such as $17\alpha$-acetoxy-1-allopregnene-3,20-dione which are described in the copending application of Reimann et al., Serial No. 817,050, filed June 1, 1959. The dihalogeno compounds are progestational in activity and find utility in the treatment of dysmenorrhea, threatened abortion and the like.

My halogenation process is not restricted to the manufacture of dihalogeno pregnanes but is equally applicable to preparing 9,11-dihalogeno androstanes such as $9\alpha, 11\beta$-dihalogeno-1,4-androstadiene-3,17-dione, the 1,2-dihydro analog and the 1,2,4,5-tetrahydro analog and other similar compounds such as are described in the copending applications of Gould et al., Serial No. 817,071 and Serial No. 817,070, filed June 1, 1959. These compounds are anabolic agents having low androgenic activity.

It is thus apparent that my novel process is generally applicable to any steroid possessing a 9,11-double bond and optionally an unsaturation elsewhere in the A-ring. My preferred steroid reactants as indicated heretofore are 3-keto, 3-keto-$\Delta^1$, 3-keto-$\Delta^4$, or 3-keto-$\Delta^{1,4}$-pregnanes and androstanes.

The following examples are illustrative of my novel process, but are not to be construed as limiting the scope thereof; the scope of my invention being limited only by the appended claims.

EXAMPLE 1

$9\alpha,11\beta$-dichloro-1,4-androstadiene-3,17-dione

A stirred solution of 1.32 g. of 1,4,9(11)-androstatriene-3,17-dione in carbon tetrachloride (40 ml.) and pyridine (0.8 ml.) is chilled to $-20°$ C. To this stirred solution is added a solution of chlorine (300 mg.) in carbon tetrachloride (3.0 ml.) and stirring is continued at $-20°$ C. for 15 minutes. The reaction mixture is then allowed to warm to room temperature during a 15 minute period, and is then diluted with methylene chloride (50 ml.). The resulting solution is washed successively with sodium thiosulfate solution, water, 10% sodium bicarbonate solution and finally with water; then dried over magnesium sulfate, filtered and evaporated in vacuo to a residue which is crystallized from acetonehexane to give $9\alpha,11\beta$-dichloro-1,4-androstadiene-3,17-dione, M.P. 227–231° C. dec., $[\alpha]_D + 178°$ (dioxane), $$\lambda_{max}^{MeOH}\ 235\ m\mu\ \epsilon = 15{,}600$$

*Analysis.*—Calcd. for $C_{19}H_{22}O_2Cl_2$: C, 64.59; H, 6.28; Cl, 20.07. Found: C, 64.24; H, 6.58; Cl, 19.67.

EXAMPLE 2

*9α-chloro-11β-fluoro-1,4-androstadiene-3,17-dione*

To a stirred solution of 1,4,9(11)-androstatriene-3,17-dione (1.0 g.) in carbon tetrachloride (30 ml.) and pyridine (5.4 ml.) at −25° C. is added a solution of hydrogen fluoride (710 mg.) in dimethylformamide (2.2 ml.) followed by N-chlorosuccinimide (520 mg.). Stirring is continued for 15 minutes at −25° C., and then for 20 hours at room temperature. The reaction mixture is then diluted with methylene chloride (100 ml.), and poured into 10% aqueous sodium bicarbonate solution (200 ml.) with stirring. The organic phase is then separated from the aqueous phase, and washed with 10% aqueous sodium bicarbonate solution, then with water. The organic washed solution is dried with magnesium sulfate, filtered and evaporated in vacuo to a solid residue which is crystallized from acetone-hexane to give 9α-chloro-11β-fluoro-1,4-androstadiene-3,17-dione, $$\lambda_{max.}^{MeOH} \ 235 \ m\mu \ \epsilon = 15,000$$

EXAMPLE 3

*9α,11β-dichloro-19-nor-4-androstene-3,17-dione*

A. 19-NOR-4,9(11)-ANDROSTADIENE-3,17-DIONE

To a stirred solution of 2.0 g. of 19-nor-4-androstene-11β-ol-3,17,dione in dimethylformamide (20 ml.) and pyridine (2.0 ml.), cooled to 0° C., is added methanesulfonyl chloride (1.60 g.). Stirring is continued at room temperature for 24 hours, and the reaction mixture is then diluted with water and extracted with methylene chloride. The organic extracts are combined and washed with aqueous 10% sodium bicarbonate solution, then with water, dried over magnesium sulfate and filtered. The methylene chloride solution is concentrated in vacuo to a residue which is dissolved in a minimum of methylene chloride and chromatographed on Florisil moistened with hexane. The 40% ether-in-hexane eluates are combined and concentrated to a residue comprising 19-nor-4,9(11)-androstadiene-3,17-dione.

B. 9α,11β-DICHLORO-19-NOR-4-ANDROSTENE-3,17-DIONE

One gram of 19-nor-4,9(11)-androstadiene-3,17-dione (the compound of Example 3A) in 40 ml. of carbon tetrachloride and 0.8 ml. of pyridine is allowed to react with a solution of 300 mg. of chloride in 3 ml. of carbon tetrachloride in the manner of Example 1. The resultant product is isolated in the described manner and crystallized from acetone-hexane to give 9α,11β-dichloro-19-nor-4-androstene-3,17-dione.

EXAMPLE 4

*9α-bromo-11β-chloro-19-nor-4-androstene-3,17-dione*

A solution of 1 g. of 19-nor-4,9(11)-androstadiene-3,17-dione (the compound of Example 3A) in 50 ml. of carbon tetrachloride and 0.85 ml. of pyridine is cooled to −20° C. and there is added 566 mg. of N-bromoacetamide and 148 mg. of hydrogen chloride in tetrahydrofuran (1.48 ml.). The reaction mixture is stirred at −20° C. for 15 minutes, then warmed to room temperature within an additional 15 minutes. The reaction mixture is diluted with methylene chloride and washed successively with sodium thiosulfate solution, water, 10% sodium bicarbonate solution and finally with water. The methylene chloride solution is dried over magnesium sulfate, filtered and evaporated in vacuo to a residue which is crystallized from methylene chloride-pentane to give 9α-bromo-11β-chloro-19-nor-4-androstene-3,17-dione.

EXAMPLE 5

*6α-fluoro-9α,11β-dichloro-19-nor-4-androstene-3,17-dione*

A. 6α-FLUORO-19-NOR-4,9(11)-ANDROSTADIENE-3,17-DIONE

Two grams of 6α-fluoro-19-nor-4-androstene-11β-ol-3,17-dione are dissolved in dimethylformamide (20 ml.) and pyridine (2 ml.) and reacted with methanesulfonyl chloride (1.60 g.) in the manner of Example 3A. The resulting product is isolated in the described manner and crystallized from acetone-hexane to give 6α-fluoro-19-nor-4,9(11)-androstadiene-3,17-dione.

B. 6α-FLUORO-9α,11β-DICHLORO-19-NOR-4-ANDROSTENE-3,17-DIONE

One gram of 6α-fluoro-19-nor-4,9(11)-androstadiene-3,17-dione (the compound of Example 5A) is dissolved in carbon tetrachloride (40 ml.) and pyridine (0.8 ml.) and reacted with chlorine (271 mg.) in the manner of Example 1. The resultant product is isolated and purified in the described manner to give 6α-fluoro-9α,11β-dichloro-19-nor-4-androstene-3,17-dione.

EXAMPLE 6

*9α-chloro-11β-fluoro-1,4-androstadiene-17β-ol-3-one*

A. 1,4,9(11)-ANDROSTATRIENE-17β-OL-3-ONE

To a solution of 200 g. of sucrose in 1.5 liters of tap water, contained in a 2-liter Fernbach flask, is added 500 mg. of 1,4,9(11)-androstatriene-3,17-dione. The resulting suspension is autoclaved at 15 lbs. pressure and at 120° C. for 45 minutes, then cooled. To the cooled solution is added 100 ml. of ethanol and 100 g. of Fleischmann bakers yeast. The pH of the reaction mixture is adjusted to 4.5–5.0 by the addition of dilute sulfuric acid, the yeast cell mass is dispersed, and mechanical agitation, sufficiently slow to maintain anaerobic conditions, is commenced. Agitation is continued for 48 hours, and during the first 12 hours the pH of the medium is adjusted hourly to 4.5–5.0 by addition of dilute ammonium hydroxide. Subsequently pH determinations and adjustments are made every 8 hours. At the end of the reaction period the mixture is centrifuged for one hour, and the supernatant liquid is separated. The remaining cell mass is extracted by refluxing for ½ hour with two 1-liter portions of methanol. The combined methanolic extracts and supernatant liquid are concentrated in vacuo to about 200 ml., and water (400 ml.) is added. The resulting aqueous solution is now extracted three times with methylene chloride, and the combined methylene chloride extracts are dried over magnesium sulfate, filtered and the filtrate evaporated in vacuo to a residue. The resulting residue is extracted three times with boiling diethyl ether, and the combined ethereal extracts are passed through a column of Florisil. The eluates are combined and evaporated to a residue which is crystallized from acetone-hexane to give 1,4,9(11)-androstatriene-17β-ol-3-one, M.P. 145–148° C. $[\alpha]_D$ −28° (dioxane), $$\lambda_{max.}^{MeOH} \ 238 \ m\mu \ \epsilon = 15,300$$

*Analysis.*—Calcd. for $C_{19}H_{24}O_2$: C, 80.24; H, 8.51. Found: C, 79.91; H, 8.90.

B. 9α-CHLORO-11β-FLUORO-1,4-ANDROSTADIENE-17β-OL-3-ONE

One gram of 1,4,9(11)-androstatriene-17β-ol-3-one (prepared according to the procedure of Example 6A), N-chlorosuccinimide (520 mg.) and hydrogen fluoride (710 mg.) are reacted in the manner of Example 2. The resulting product is isolated and purified in the described manner to give 9α-chloro-11β-fluoro-1,4-androstadiene-17β-ol-3-one, M.P. 212–215° C. $[\alpha]_D$ +73° (dioxane), $$\lambda_{max.}^{MeOH} \ 237 \ m\mu \ \epsilon = 14,900$$

*Analysis.*—Calcd. for $C_{19}H_{24}O_2ClF$: C, 67.34; H, 7.14;

Cl, 10.47; F, 5.61. Found: C, 67.96; H, 6.82; Cl, 10.78; F, 5.46.

EXAMPLE 7

*9α,11β-dichloro-1,4-androstadiene-17β-ol-3-one*

To a stirred solution of 1.0 g. of 1,4,9(11)-androstatriene-17β-ol-3-one (prepared according to the procedure of Example 6A) in carbon tetrachloride (50 ml.) and pyridine (0.8 ml.) at −20° C. is added N-chlorosuccinimide (520 mg.) and a solution of hydrogen chloride (140 mg.) in tetrahydrofuran (1.4 ml.). Stirring is continued at −20° C. for 15 minutes and the reaction mixture is then allowed to attain room temperature during a further 15 minutes. Methylene chloride (50 ml.) is added, and the solution is washed successively with sodium thiosulfate solution, water, 10% sodium bicarbonate solution and finally with water, dried over magnesium sulfate, filtered and evaporated in vacuo to a residue which is crystallized from methylene chloride-hexane to give 9α,11β-dichloro-1,4-androstadiene-17β-ol-3-one, $\lambda_{max.}^{MeOH}$ 237 m$\mu$ (15,300)

EXAMPLE 8

*9α-chloro-11β-fluoro-1,4-androstadiene-17β-ol-3-one 17-propionate*

A. 1,4,9(11)-ANDROSTATRIENE-17β-OL-3-ONE 17-PROPIONATE

To a solution of 1 g. of 1,4,9(11)-androstatriene-17β-ol-3-one (the compound of Example 6A) in pyridine (20 ml.) at room temperature is added propionic anhydride (5 ml.) and the reaction mixture is allowed to stand for 17 hours at room temperature. The reaction mixture is then poured into crushed ice and the resulting mixture is allowed to attain room temperature, then filtered. The residue is washed with water, dried and crystallized from acetone-hexane to give 1,4,9(11)-androstratriene-17β-ol-3-one 17-propionate, M.P. 137–138° C. $[\alpha]_D$ −12° (dioxane), $\lambda_{max.}^{MeOH}$ 238 m$\mu$ $\epsilon$ = 15,400

*Analysis.*—Calcd. for $C_{22}H_{28}O_3$: C, 77.61; H, 8.29. Found: C, 77.94; H, 8.46.

B. 9α-CHLORO-11β-FLUORO-1,4-ANDROSTADIENE-17β-OL-3-ONE 17-PROPIONATE

To a stirred solution of 1.0 g. of 1,4,9(11)-androstatriene-17β-ol-3-one 17-propionate (prepared as in Example 8A) in carbon tetrachloride (30 ml.) and pyridine (4.6 ml.) at −25° is added a solution of hydrogen fluoride (590 mg.) in dimethylformamide (1.8 ml.) followed by N-chloro-succinimide (432 mg.). Stirring is continued at −25° C. for 15 minutes, and then at room temperature for 20 hours. The reaction mixture is then diluted with methylene chloride (100 ml.) and poured into 10% aqueous sodium bicarbonate solution (200 ml.) with stirring. The organic phase is then separated and washed with 10% sodium bicarbonate solution, then with water, and is dried with magnesium sulfate. Evaporation of the solvent in vacuo yields the crude product which on crystallization from acetone-hexane gives 9α-chloro-11β-fluoro-1,4-androstadiene-17β-ol-3-one 17-propionate, M.P. 170–175° C., $[\alpha]_D$ +63° (dioxane), $\lambda_{max.}^{MeOH}$ 236 m$\mu$ $\epsilon$ = 15,000

*Analysis.*—Calcd. for $C_2H_{28}O_3ClF$: C, 66.91; H, 7.15; Cl, 8.98; F, 4.81. Found: C, 66.55; H, 7.17; Cl. 9.15; F, 4.64.

EXAMPLE 9

*9α-bromo-11β-fluoro-1,4-androstadiene-17β-ol-3-one 17-propionate*

One gram of 1,4,9(11)-androstatriene-17β-ol-3-one 17-propionate (prepared as in Example 8A) dissolved in 30 ml. of carbon tetrachloride and 4.6 ml. of pyridine is cooled to −25° C. and there is added a solution of hydrogen fluoride (590 mg.) in dimethylformamide (1.8 ml.) followed by 443 mg. of N-bromoacetamide. The reaction mixture is stirred at −25° C. for 15 minutes and then at room temperature for 20 hours. The reaction mixture is ten diluted with methylenechloride and poured into ice-cooled 10% aqueous sodium bicarbonate solution with stirring. The organic phase is separated, washed with 10% sodium bicarbonate solution, then with water, dried over magnesium sulfate, filtered and concentrated in vacuo to a residue which is crystallized from acetone-hexane to give 9α-bromo-11β-fluoro-1,4-androstadiene-17β-ol-3-one 17-propionate, M.P. 160–162° C. $[\alpha]_D$ +64° (dioxane), $\lambda_{max.}^{MeOH}$ 239 m$\mu$ $\epsilon$ = 14,400

*Analysis.*—Calcd. for $C_{22}H_{28}O_3BrF$: C, 60.14; H, 6.42; Br, 18.19; F, 4.32. Found: C, 60.22; H, 6.55; Br, 19.10; F, 4.13.

EXAMPLE 10

*9α,11β-dichloroprogesterone*

One gram of 4,9(11)-pregnadiene-3,20-dione is dissolved in 30 ml. of carbon tetrachloride and 0.75 ml. of pyridine, cooled to −20° C. and there is added 2.1 ml. of a solution of chlorine in carbon tetrachloride (111 mg./ml.). The mixture is stirred at −20° C. for 15 minutes then allowed to warm to room temperature over a period of one-half hour. The solution is filtered and the filtrate concentrated in vacuo to an oily residue. Trituration of this residue with ether yields a solid which is crystallized from acetone-hexane to give 9α,11β-dichloroprogesterone, M.P. 174–177° C., dec.

$\lambda_{max.}^{MeOH}$ 238 m$\mu$ $\epsilon$ = 16,200 $[\alpha]_D$ +243° (chloroform)

*Analysis.*—Calcd. for $C_{21}H_{28}O_2Cl_2$: C, 65.79; H, 7.36; Cl 18.50. Found: C, 65.46; H, 7.59; Cl 18.66.

EXAMPLE 11

*9α-chloro-11β-fluoro-1,4-pregnadiene-3,20-dione*

A. 1,4,9(11)-PREGNATRIENE-3,20-DIONE

Five grams of 4,9(11)-pregnadiene-3,20-dione is fermented with *Corynebacterium simplex* (A.T.C.C. 6946) according to the procedure of U.S. Patent No. 2,837,464 as follows.

A 100 ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmeyer flask, is seeded with 1 ml. of a 24-hour broth culture of *Corynebacterium simplex* (A.T.C.C. 6946). The flask is incubated at 28° C. for 24 hours. A second 300 ml. Erlenmeyer flask containing 150 mg. of sterile 4,9(11)-pregnadiene-3,20-dione in 5.0 ml. acetone is inoculated with the 24 hour culture of *Corynebacterium simplex* (A.T.C.C. 6946). The culture-containing steriod solution is incubated for 48 hours at 28° to 30° C.

After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 1,4,9(11)-pregnatriene-3,20-dione, M.P. 135–138° C., 147–150° C. (double M.P.)

$\lambda_{max.}^{MeOH}$ 240 m$\mu$ $\epsilon$ = 15,500, $[\alpha]_D$ +75° chloroform

*Analysis.*—Calcd. for $C_{21}H_{26}O_2$: C, 81.25; H, 8.44. Found: C, 81.24; H, 8.52.

B. 9α-CHLORO-11β-FLUORO-1,4-PREGNADIENE-3,20-DIONE

To a solution of 500 mg. of 1,4,9(11)-pregnatriene-3,20-dione (the compound of Example 11A) in 20 ml. of carbon tetrachloride and 3 ml. of pyridine, there is added a solution of 310 mg. of hydrogen fluoride in 1.5 ml. of a mixture of tetrahydrofuran and chloroform followed by 230 mg. of N-chlorosuccinimide. The reaction mixture is diluted with sufficient methylene chloride to give a solution and is stirred for 48 hours at room temperature, then poured into aqueous sodium carbonate. The crude mixture is extracted with methylene chloride, the organic extracts combined, washed with water, dilute hydrochloric acid and finally with water. The solution is then dried over magnesium sulfate, filtered and evaporated to a residue which is triturated with ether, filtered and crystallized from acetone-hexane to give 9α-chloro-11β-fluoro-1,4-pregnadiene-3,20-dione, M.P. 215–220° C.

$\lambda_{max.}^{MeOH}$ 236 mμ $\epsilon$ = 15,100, $[\alpha]_D$ +141° (chloroform)

*Analysis.*—Calcd. for $C_{21}H_{26}O_2ClF$: F, 5.21. Found: F, 5.57.

EXAMPLE 12

9α,11β-dibromo-19-norprogesterone

A. 19-NOR-4,9(11)-PREGNADIENE-3,20-DIONE

A solution of 2 g. of 11β-hydroxy-19-nor-4-pregnene-3,20-dione in 10 ml. of dimethylformamide and 2 ml. of pyridine is chilled to 0° C. A solution of 1.0 g. of methanesulfonyl chloride in 10 ml. of dimethylformamide is added dropwise. The reaction mixture is stirred at room temperature for 24 hours, and then is poured into ice-water. A solid precipitate forms which is filtered, washed with water, and crystallized from acetone-hexane to give 19-nor-4,9(11)-pregnadiene-3,20-dione $\lambda_{max.}^{MeOH}$ 240 mμ

B. 9α,11β-DIBROMO-19-NORPROGESTERONE

To 500 mg. of 19-nor-4,9(11)-pregnadiene-3,20-dione (the compound of Example 12A) dissolved in 30 ml. of carbon tetrachloride there is added 0.5 ml. of pyridine. The solution is chilled to −20° C. and there is added a solution of 270 mg. of bromine in 5 ml. of carbon tetrachloride. The reaction mixture is stirred at −20° C. for 30 minutes, then diluted with methylene chloride and washed with 5% hydrochloric acid, 5% aqueous sodium bicarbonate and, finally with water. The solution is dried over magnesium sulfate, filtered, and concentrated in vacuo. The resultant residue, dissolved in 5 ml. of methylene chloride is placed on a column of silica gel in ether. The column is eluted with ether. The eluates are combined and concentrated to a residue which is crystallized from methylene chloridepentane to give 9α,11β-dibromo-19-norprogresterone.

EXAMPLE 13

9α,11β-dichloro-17α-hydroxyprogesterone 17-acetate

A. 17α-HYDROXY-4,9(11)-PREGNADIENE-3,20-DIONE 17-ACETATE

To a solution of 5.0 g. of 17α-hydroxy-4,9(11)-pregnadiene-3,20-dione in 50 ml. of acetic acid there is added 10 ml. of trifluoroacetic anhydride. The solution is heated on the steam bath for 45 minutes, then is poured into ice-water. A solid separates which is filtered and crystallized from acetone-ether to give 17α-hydroxy-4,9(11)-pregnadiene-3,20-dione 17-acetate, M.P. 238–241° C.,$[\alpha]_D$ +50° (chloroform), $\lambda_{max.}^{MeOH}$ 239 mμ $\epsilon$ = 17,000

*Analysis.*—Calcd. for $C_{23}H_{30}O_4$: C, 74.56; H, 8.16. Found: C, 74.64; H, 8.07.

B. 9α,11β-DICHLORO-17α-HYDROXYPROGESTERONE 17-ACETATE

One gram of 17α-hydroxy-4,9(11)-pregnadiene-3,20-dione 17-acetate (the compound of Example 13A) dissolved in 30 ml. of carbon tetrachloride is chlorinated with 1.8 ml. of chlorine in carbon tetrachloride (111 mg./ml.) in the presence of 0.65 ml. of pyridine at −20° C. in the manner described in Example 10. The resultant product is isolated in the described manner and crystallized from acetone-hexane to give 9α,11β-dichloro-17α-hydroxy-progesterone 17-acetate, M.P. 224–233° C. dec., $[\alpha]_D$ +129° (chloroform)

$\lambda_{max.}^{MeOH}$ 238 mμ $\epsilon$ = 17,000

*Analysis.*—Calcd. for $C_{23}H_{30}O_4Cl_2$: C, 62.58; H, 6.85; Cl. 16.06. Found: C, 62.63; H, 7.03; Cl. 15.90.

EXAMPLE 14

9α-iodo-11β-fluoro-17α-hydroxyprogesterone 17-acetate

To a solution of 500 mg. of 17α-hydroxy-4,9(11)-pregnadiene-3,20-dione 17-acetate (the compound of Example 13A) in 20 ml. of carbon tetrachloride and 3 ml. of pyridine there is added a solution of 620 mg. of hydrogen fluoride in 3.2 ml. of a mixture of tetrahydrofuran and chloroform followed by 320 mg. of N-iodosuccinimide. The reaction mixture is diluted with sufficient methylene chloride to give a solution and is stirred for 48 hours at room temperature, then poured into aqueous sodium carbonate. The crude mixture is extracted with methylene chloride. The organic extracts are combined, washed with water, dilute hydrochloric acid and finally with water. The solution is then dried over magnesium sulfate, filtered and concentrated in vacuo. The resultant residue is chromatographed on silica gel. The fraction eluted with 50% ether-hexane yield 9α-iodo-11β-fluoro-17α-hydroxyprogesterone 17-acetate.

EXAMPLE 15

9α,11β-dichloro-17α-hydroxy-1,4-pregnadiene-3,20-dione

A. 17α-HYDROXY-1,4,9(11)-PREGNATRIENE-3,20-DIONE

In the manner similar to that described in Example 11A, 17α-hydroxy-4,9(11)-pregnadiene-3,20-dione is subjected to the action of a culture of *Corynebacterium simplex* and the resultant product isolated and purified to give 17α-hydroxy-1,4,9(11)-pregnatriene-3,20-dione, M.P. 233–235° C.

$\lambda_{max.}^{MeOH}$ 238 mμ, $\epsilon$ = 15,600 $[\alpha]_D$ −19° (chloroform)

B. 9α,11β-DICHLORO-17α-HYDROXY-1,4-PREGNADIENE-3,20-DIONE

One gram of 17α-hydroxy-1,4,9(11)-pregnatriene-3,20-dione (the compound of Example 15A) is reacted with 220 mg. of chlorine gas in carbon tetrachloride in the presence of pyridine in the manner described in Example 10. The resultant product is isolated and purified in the described manner to give 9α,11β-dichloro-17α-hydroxy-1,4-pregnadiene-3,20-dione, M.P. 235–239° C. dec.

$\lambda_{max.}^{MeOH}$ 238 mμ, $\epsilon$ = 14,700 $[\alpha]_D$ +119° (chloroform)

*Analysis.*—Calcd. for $C_{23}H_{28}O_4Cl_2$: C, 62.87; H, 6.42; Cl. 16.14. Found: C, 62.26; H, 6.73; Cl 15.85.

EXAMPLE 16

9α-iodo-11β-bromo-17α-hydroxyprogesterone 17-acetate

To a solution of 1 g. of 17α-hydroxy-4,9(11)-pregnadiene-3,20-dione 17-acetate (prepared as described in Example 13A) in 40 ml. of carbon tetrachloride and 1 ml. of pyridine there is added a solution of 220 mg. of hydrogen bromide in 1 ml. of a mixture of tetrahydrofuran and chloroform followed by 620 mg. of N-iodosuccinimide. The reaction mixture is diluted with sufficient methylene chloride to give a solution and is stirred for 48 hours at room temperature and then poured into aqueous sodium carbonate. The crude mixture is extracted with methylene chloride and the organic extracts combined, washed with water, diluted hydrochloric acid and finally with water. The solution is then dried over magnesium sulfate, filtered and evaporated to a residue which is chromatographed on silica gel. The substance eluted with 30% ether-in-hexane is crystallized from acetone-hexane to give 9α-iodo-11β-bromo-17α-hydroxyprogesterone 17-acetate.

EXAMPLE 17

*9α-bromo-11β-fluoro-17α-hydroxy-19-norprogesterone 17-caproate*

A. 11β,17α-DIHYDROXY-19-NORPROGESTERONE

A living culture of the organism *Curvularia lunata* (N.R.R.L. 2380) is rinsed from an agar slant under sterile conditions into a sterile medium having the following composition:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |
| Distilled water, adjusted to pH 7.0 with potassium hydroxide. | |

100 ml. of this medium is placed in each of several 300 ml. flasks. To each flask is added 50 mg. of 17α-hydroxy-19-norprogesterone dissolved in a small volume of acetone. The mixture is shaken for a period of 7 days at a room temperature of about 28° C. The contents of the flasks are then combined and extracted with several portions of ethylene dichloride using one-fifth the volume of the aqueous phase each time. The combined organic extracts are dried over sodium sulfate filtered and concentrated in vacuo to a residue having a volume of 1–2 ml.

The ethylene dichloride residue is then placed on a chromatographic column consisting of silica gel, mixed with a small volume of methylene chloride. The column is developed with methylene chloride and the eluates are combined and concentrated in vacuo to a residue which is crystallized from acetone-hexane to give 11β,17α-dihydroxy-19-norprogesterone.

B. 17α-HYDROXY-19-NOR-4,9(11)-PREGNADIENE-3,20-DIONE

Two grams of 11β,17α-dihydroxy-19-norprogesterone, prepared as described in Example 26A, in 50 ml. of pyridine is chilled to 0° C., and there is added 5 ml. of methanesulfonyl chloride dissolved in 10 ml. of pyridine. The mixture is allowed to stand in the ice-box for 96 hours. A small amount of ice is added to the reaction mixture, and the solution is diluted with chloroform, washed with water, then with 5% hydrochloric acid, 5% sodium bicarbonate and finally again with water. The solution is dried over sodium sulfate, filtered, and concentrated in vacuo to a residue which is crystallized from methylene chloride-hexane to give 17α-hydroxy-19-nor-4,9(11)-pregnadiene-3,20-dione.

C. 9α-BROMO-11β-FLUORO-17α-HYDROXY-19-NORPROGESTERONE

To a solution of 500 mg. of 17α-hydroxy-19-nor-4,9(11)-pregnadiene-3,20-dione (the compound of Example 17B) in 20 ml. of carbon tetrachloride and 2 ml. of pyridine there is added a solution of 250 mg. of hydrogen fluoride in 2 ml. of chloroform-tetrahydrofuran mixture followed by 220 mg. of N-bromoacetamide. The reaction mixture is diluted with sufficient methylene chloride to give a solution and is stirred for 48 hours at room temperature. The reaction mixture is then poured into aqueous sodium carbonate and extracted with methylene chloride. The organic extracts are combined, washed with water, dilute hydrochloric acid and finally with water. The solution is then dried over magnesium sulfate, filtered and evaporated to a residue which is dissolved in acetone-ether and filtered through a column of Florisil in ether. The eluates are combined, the ether distilled in vacuo and the resultant residue crystallized from methylene chloridepentane to give 9α-bromo-11β-fluoro-17α-hydroxy-19-norprogesterone.

D. 9α-BROMO-11β-FLUORO-17α-HYDROXY-19-NORPROGESTERONE 17-CAPROATE

A mixture of 1 g. of 9α-bromo-11β-fluoro-17α-hydroxy-19-norprogesterone (the compound of Example 17C) and 10 ml. of caproic acid is heated at 80° C., in the presence of 2.0 ml. of trifluoroacetic anhydride, for 45 minutes. The mixture is poured into ice-water and the excess acid neutralized with sodium carbonate. The crude reaction mixture is extracted with methylene chloride. The organic extracts are combined and concentrated to a residue which is chromatographed on Florisil. The material eluted with 10–25% ether-in-hexane is combined and crystallized from pentane to yield 9α-bromo-11β-fluoro - 17α - hydroxy - 19 - norprogesterone 17-caproate.

EXAMPLE 18

*9α-bromo-11β-chloro-17α-methylprogesterone*

A. 17α-METHYL-21-HYDROXY-4,9(11)-PREGNADIENE-3,20-DIONE 21-METHANESULFONATE

A solution of 5 g. of 17α-methyl-11β,21-dihydroxy-4-pregnene-3,20-dione in 100 ml. of pyridine is chilled to 0° C. and a solution of 10 ml. of methanesulfonyl chloride in 20 ml. of chloroform is added dropwise. The mixture is allowed to stand in the ice box for 100 hours, then a little ice is added and the solution diluted with chloroform. The organic solution is washed with water, 5% hydrochloric acid, 5% aqueous sodium bicarbonate, and again with water. The solution is dried over magnesium sulfate, filtered and concentrated in vacuo to a residue which is crystallized twice from acetone-hexane to give 17α-methyl-21-hydroxy-4,9(11)-pregnadiene-3,20-dione 21-methanesulfonate.

B. 17α-METHYL-4,9(11)-PREGNADIENE-3,20-DIONE

To a solution of 2.0 g. of 17α-methyl-21-hydroxy-4,9(11) - pregnadiene - 3,20 - dione 21 - methanesulfonate (the compound of Example 18A) in 30 ml. of acetic acid is added 4.0 g. of sodium iodide. The mixture is heated on the steam-bath for 30 minutes, then cooled and decolorized by the addition of aqueous sodium bisulfite solution. The solution is then poured into ice water. A precipitate forms which is filtered, washed with water, and crystallized from acetone-hexane to give 17α-methyl-4,9(11)-pregnadiene-3,20-dione.

C. 9α-BROMO-11β-CHLORO-17αMETHYLPROGESTERONE

To a stirred solution of 1 g. of 17α-methyl-4,9(11)-pregnadiene-3,20-dione (the compound of Example 18B) in 50 ml. of carbon tetrachloride and 0.8 ml. of pyridine, cooled to −20° C., is added 462 mg. of N-bromoacetamide and a solution of 123 mg. of hydrogen chloride in 1.23 ml. tetrahydrofuran. Stirring is continued at −20° C. for 15 minutes and the reaction mixture is allowed to attain room temperature over an additional 15 minutes. Methylene chloride is then added to the reaction mixture and the resultant mixture is washed successively with thiosulfate solution, water, 10% sodium bicarbonate, and finally with water. A solution is dried over magnesium sulfate, filtered and concentrated in vacuo to a residue which is crystallized from acetone-hexane to give 9α-bromo-11β-chloro-17α-methylprogesterone.

EXAMPLE 19

*9α-chloro-11β-fluoro-17α-bromoprogesterone*

A. 11β-HYDROXY-17α-BROMOPROGESTERONE

17α-bromoprogesterone is subjected to the action of a culture of *Curvularia lunata* in the manner of Example 17A and the resultant product isolated in the described manner and crystallized twice from ethyl acetate to give 11β-hydroxy-17α-bromoprogesterone.

B. 17α-BROMO-4,9(11)-PREGNADIENE-3,20-DIONE

A mixture of 2 g. of 17α-bromo-11β-hydroxyprogesterone (the compound of Example 19A) and 4 g. of dry lithium bromide in 50 ml. of glacial acetic acid is refluxed under anhydrous conditions for 30 minutes. The solution is then cooled and poured into ice-water. A solid precipitates which is filtered, washed well with water, and recrystallized twice from acetone-hexane to give 17α-bromo-4,9(11)-pregnadiene-3,20-dione.

C. 9α-CHLORO-11β-FLUORO-17α-BROMOPROGESTERONE 500 mg. of the 17α-bromopregnadiene of Example 19B in 20 ml. of carbon tetrachloride and 3 ml. of pyridine is reacted with 180 mg. of N-chlorosuccinimide and a solution of 860 mg. of hydrogen fluoride in 1.5 ml. of a mixture of tetrahydrofuran in chloroform in the manner described in Example 11B. The resultant product is isolated in the described manner and chromatographed on silica gel. The material eluted with 30% ether-in-hexane is crystallized twice from methylene-chloride-pentane to give 9α-chloro-11β-fluoro-17α-bromoprogesterone.

EXAMPLE 20

*9α,11β,17α-trichloroprogesterone*

The requisite intermediate, 17α-chloro-4,9(11)-pregnadiene-3,20-dione, is prepared from 3β-hydroxy-5-pregnene-20-one 3-acetate according to procedures described in the copending application of Reimann and Gould, U.S. Serial No. 817,050, filed June 1, 1959.

17α-chloro-4,9(11)-pregnadiene-3,20 - dione is reacted with chlorine in carbon tetrachloride in the presence of pyridine in the manner described in Example 10 to give 9α,11β,17α-trichloroprogesterone.

EXAMPLE 21

*9α,11β-dichloro-17α-hydroxy-1-allopregnene-3,20-dione 17-acetate*

A. 11β,17α-DIHYDROXY-1-ALLOPREGNENE-3,20-DIONE 17-ACETATE

In the manner described in Example 17A, 17α-hydroxy-1-allopregnene-3,20-dione 17-acetate is subjected to the action of a culture of the microorganism *Curvularia lunata*. The resultant product is isolated and purified in the described manner to give 11β,17α-dihydroxy-1-allopregnene-3,20-dione 17-acetate.

B. 17α-HYDROXY-1,9(11)-ALLOPREGNADIENE-3,20-DIONE 17-ACETATE

The 11β-hydroxyallopregnene of Example 21A is reacted with methanesulfonyl chloride in pyridine and the resultant product isolated and purified in the manner described in Example 17B to give 17α-hydroxy-1,9(11)-allopregnadiene-3,20-dione 17-acetate.

C. 9α,11β-DICHLORO-17α-HYDROXY-1-ALLOPREGNENE-3,20-DIONE 17-ACETATE

17α-hydroxy-1,9(11) - allopregnadiene-3,20 - dione 17-acetate (the compound of Example 21B) is chlorinated with chlorine in carbon tetrachloride in the presence of pyridine in the manner described in Example 10. The resultant product is isolated and purified in the described manner to give 9α,11β-dichloro-17α-hydroxy-1-allopregnene-3,20-dione 17-acetate.

EXAMPLE 22

*6β-methyl-9α,11β-dichloroprogesterone*

A. 6β-METHYL-11β-HYDROXYPROGESTERONE

In the manner described in Example 17A, 6β-methylprogesterone is subjected to the action of a culture of the microorganism *Curvularia lunata* and the resultant product isolated and purified to give 6β-methyl-11β-hydroxyprogesterone.

B. 6β-METHYL-4,9(11)-PREGNADIENE-3,20-DIONE

A solution of 3 g. of 6β-methyl-11β-hydroxyprogesterone (prepared as in Example 22A) in a mixture of 20 ml. of dimethylformamide and 5 ml. of dry pyridine is chilled in an ice-bath and there is added dropwise a solution of 3.2 g. of methanesulfonyl chloride in 30 ml. of dimethylformamide. Stirring is continued at room temperature for 28 hours after which the mixture is poured into ice-water. A precipitate forms which is filtered, washed with water and crystallized from acetone-hexane to give 6β-methyl-4,9(11)-pregnadiene-3,20-dione.

C. 6β-METHYL-9α,11β-DICHLOROPROGESTERONE

One gram of 6β-methyl-4,9(11)-pregnadiene-3,20-dione (the compound of Example 22B, dissolved in 30 ml. of carbon tetrachloride is reacted with a solution of 220 mg. of chlorine in 3 ml. of carbon tetrachloride and 0.65 ml. of pyridine in the manner of Example 1. The resultant product is isolated and purified in the described manner to give 6β-methyl-9α,11β-dichloroprogesterone.

EXAMPLE 23

*6β,11β-difluoro-9α-bromoprogesterone*

A. 6β-FLUORO-4,9(11)-PREGNADIENE-3,20-DIONE

Two grams of 6β-fluoro-11β-hydroxyprogesterone is reacted with methanesulfonyl chloride in dimethylformamide-pyridine in the manner of Example 22B. The resultant product is isolated in the described manner and crystallized twice from acetone-hexane to give 6β-fluoro-4,9(11)-pregnadiene-3,20-dione.

B. 6β,11β-DIFLUORO-9α-BROMOPROGESTERONE

One gram of 6β-fluoro-4,9(11)-pregnadiene-3,20-dione (the compound of Example 23A) dissolved in 30 ml. of carbon tetrachloride and 0.8 ml. of pyridine is reacted with 607 mg. of hydrogen fluoride and 457 mg. of N-bromoacetamide according to the procedure of Example 9. The resultant product is isolated in the described manner to yield a solid product which is dissolved in acetone-ether and filtered through a column of Florisil in ether. The column is eluted with ether and the combined eluates are distilled in vacuo to yield a residue which is triturated with pentane-ether, then crystallized from methylene chloride-pentane to give 6β-11β-difluoro-9α-bromoprogesterone.

EXAMPLE 24

*6α-methyl-9α-chloro-11β-fluoroprogesterone*

A. 6α-METHYL-11α-HYDROXYPROGESTERONE 11-p-TOLUENESULFONATE

A solution of 10 g. of 6α-methyl-11α-hydroxyprogesterone in 40 ml. of chloroform and 50 ml. of dry pyridine is chilled in ice and 12 g. of p-toluenesulfonyl chloride is added in small portions. The reaction mixture is stirred at 0° C. for 1 hour, then allowed to stand at room temperature for 18 hours. The mixture is then poured into ice-water, stirred thoroughly and extracted with chloroform. The organic solution is washed with water and concentrated in vacuo to a residue which is triturated with a small amount of methanol and filtered to give 6α-methyl-11α-hydroxyprogesterone 11-p - toluenesulfonate, which is used without further purification in the next step.

B. 6α-METHYL-4,9(11)-PREGNADIENE-3,20-DIONE

To a solution of 15 g. of anhydrous sodium acetate in 140 ml. of acetic acid, heated to about 110° C., is added 10 g. of the 11α-p-toluenesulfonate of Example 24A. The solution is refluxed for 30 minutes, then chilled in ice and diluted with cold water. A solid product forms which is filtered, washed with dilute acetic acid, dried at room temperature and crystallized from acetone-hexane to give 6α-methyl-4,9(11)-pregnadiene-3,20-dione.

C. 6α-METHYL-9α-CHLORO-11β-FLUOROPROGESTERONE

In the manner described in Example 11B, a solution of 500 mg. of 6α-methyl-4,9(11)-pregnadiene-3,20-dione (the compound of Example 24B) in 20 ml. of carbon tetrachloride and 3 ml. of pyridine is reacted with a solution of 860 mg. of hydrogen fluoride in 1.5 ml. of a mixture of tetrahydrofuran and chloroform and 230 mg. of N-chlorosuccinimide. The resultant product is isolated in the described manner to yield a residue which is chromatographed on silica gel. The product eluted with 25% ether-in-hexane is crystallized from methylene chloride-hexane to give 6α-methyl-9α-chloro-11β-fluoroprogesterone.

EXAMPLE 25

*9α-iodo-11β-chloro-21-fluoroprogesterone*

A. 21-FLUORO-4,9(11)-PREGNADIENE-3,20-DIONE

A solution of 5 g. of 11β-hydroxy-21-fluoroprogesterone dissolved in 20 ml. of dimethylformamide and 5 ml. of dry pyridine is reacted with 4 g. of methanesulfonyl chloride in the manner of Example 22B. The resultant product is isolated in the described manner and crystallized from acetone-hexane to give 21-fluoro-4,9(11)-pregnadiene-3,20-dione.

B. 9α-IODO-11β-CHLORO-21-FLUOROPROGESTERONE

To a solution of 500 mg. of 21-fluoro-4,9(11)-pregnadiene-3,20-dione (the compound of Example 25A) in 40 ml. of carbon tetrachloride and 0.8 ml. of pyridine, there is added a solution of 61 mg. of hydrogen chloride in 0.61 ml. of a mixture of tetrahydrofuran and chloroform followed by 375 mg. of N-iodosuccinimide. The reaction mixture is diluted with sufficient methylene chloride to give a solution and is stirred for 48 hours at room temperature, then poured into aqueous sodium carbonate. The crude mixture is extracted with methylene chloride. The organic extracts are combined, washed with water, diluted hydrochloric acid and finally with water. The solution is then dried over magnesium sulfate, filtered and concentrated in vacuo. The resultant residue is dissolved in methylene chloride and filtered through a column of Florisil in ether. The ether eluates are combined and concentrated in vacuo at room temperature to a residue which is triturated with ether. The resultant solid product is filtered and crystallized twice from pentane-methylene chloride to give 9α-iodo-11β-chloro-21-fluoroprogesterone.

EXAMPLE 26

*9α,11β-dibromo-21-fluoro-1,4-pregnadiene-3,20-dione*

A. 21-FLUORO-1,4,9(11)-PREGNATRIENE-3,20-DIONE

According to the procedure of Example 15A, 21-fluoro-4,9(11)-pregnadiene-3,20-dione is subjected to the action of a culture of the microorganism *Corynebacterium simplex* and the resultant product isolated and purified to give 21-fluoro-1,4,9(11)-pregnatriene-3,20-dione.

B. 9α,11β-DIBROMO-21-FLUORO-1,4-PREGNADIENE-3,20-DIONE

In the manner described in Example 12B 500 mg. of 21-fluoro-1,4,9(11)-pregnatriene-3,20-dione (prepared as in Example 26A) is dissolved in 30 ml. of carbon tetrachloride and 0.5 ml. of pyridine and reacted with a solution of 270 mg. of bromine and 5 ml. of carbon tetrachloride. The resultant product is isolated in the described manner and crystallized twice from acetone-hexane to give 9α,11β-dibromo-21-fluoro-1,4-pregnadiene-3,20-dione.

EXAMPLE 27

*9α-bromo-11β-chloro-21-fluoro-17α-hydroxyprogesterone 17-acetate*

The requisite intermediate, 17α-hydroxy-21-fluoro-4,9(11)-pregnadiene-3,20-dione 17-acetate is prepared from 17α-hydroxy-21-bromo-4,9(11)-pregnadiene-3,20-dione according to procedures described in copending application of Reimann and Gould, U.S. Serial No. 817,032, filed June 1, 1959.

One gram of 17α-hydroxy-21-fluoro-4,9(11)-pregnadiene-3,20-dione 17-acetate in 50 ml. of carbon tetrachloride and 0.8 ml. of pyridine is reacted with 414 mg. of N-bromoacetamide and a solution of 110 mg. of hydrogen chloride in 1 ml. of tetrahydrofuran in the manner described in Example 18C. The resultant product is isolated in the described manner and crystallized from acetone-hexane to give 9α-bromo-11β-chloro-21-fluoro-17α-hydroxyprogesterone 17-acetate, $$\lambda_{max.}^{MeOH} \; 241 \; m\mu$$

EXAMPLE 28

*9α,11β-dichloro-21-iodoprogesterone*

A. 21-HYDROXY-4,9(11)-PREGNADIENE-3,20-DIONE 21-TOSYLATE

To a solution of 10 g. of 21-hydroxy-4,9(11)-pregnadiene-3,20-dione in 200 ml. of pyridine, chilled to −20° C. is added a solution of 10 g. of p-toluenesulfonyl chloride in 50 ml. of methylene chloride. The mixture is stirred in the cold overnight, then a few pieces of ice are added and the mixture diluted with methylene chloride. The organic solution is washed with water, dilute hydrochloric acid, sodium bicarbonate and water. The solution is dried over magnesium sulfate, filtered and concentrated in vacuo to a residue which is crystallized from acetone-hexane to give 21-hydroxy-4,9(11)-pregnadiene-3,20-dione 21-tosylate.

B. 21-IODO-4,9(11)-PREGNADIENE-3,20-DIONE

A solution of 5 g. of the 21-tosylate of the compound of Example 28A in 50 ml. of acetone containing a few drops of pyridine is warmed slightly and there is added a warm solution of 10 g. of sodium iodide in 20 ml. of acetone. The mixture is warmed on the steam bath for five minutes, then poured into cold water. A solid separates which is filtered, washed with water and crystallized from acetone-hexane to give 21-iodo-4,9(11)-pregnadiene-3,20-dione, $$\lambda_{max.}^{MeOH} \; 240 \; m\mu$$

C. 9α,11β-DICHLORO-21-IODOPROGESTERONE

One gram of 21-iodo-4,9(11)-pregnadiene-3,20-dione (the compound of Example 28B) is dissolved in 20 ml. of carbon tetrachloride and reacted with 165 mg. of chlorine gas in 2 ml. of carbon tetrachloride and 0.5 ml. of pyridine at −20° C. in the manner of Example 1. The resultant product is isolated and purified in the described manner to give 9α,11β-dichloro-21-iodoprogesterone, $$\lambda_{max.}^{MeOH} \; 238 \; m\mu$$

EXAMPLE 29

*9α-chloro-11β,21-difluoro-17α-methyl-4,9(11)-pregnadiene-3,20-dione*

The requisite intermediate, 17α-methyl-21-fluoro-1,4,9(11)-pregnatriene-3,20-dione is prepared from 17α-methylhydrocortisone (17α-methyl-11β,21-dihydroxy-4-pregnene-3,20-dione) according to procedures described in the copending application of Reimann and Gould, U.S. Serial No. 817,032, filed June 1, 1959.

500 mg. of 17α-methyl-21-fluoro-1,4,9(11)-pregnatriene-3,20-dione dissolved in 20 ml. of carbon tetrachloride and 3.0 ml. of pyridine is reacted with 231 mg. of N-chlorosuccinimide and 300 mg. of hydrogen fluoride in 1.5 ml. of a mixture of tetrahydrofuran in chloroform in the manner described in Example 11B. The resultant product is isolated in the described manner to yield a residue which is chromatographed on Florisil. The product eluted with 20–40% ether-in-hexane is combined and crystallized from methylene chloride-hexane to give 9α-chloro-11β,21-difluoro-17α-methyl-4,9(11)-pregnadiene-3,20-dione.

EXAMPLE 30

*9α,17α-dibromo-11β,21-difluoroprogesterone*

The requisite intermediate, 17α-bromo-21-fluoro-4,9(11)-pregnadiene-3,20-dione is prepared from 17α-bromoprogesterone according to procedures described in copending application of Reimann and Gould, U.S. Serial No. 817,032, filed June 1, 1959.

500 mg. of 17α-bromo-21-fluoro-4,9(11)-pregnadiene-3,20-dione dissolved in 20 ml. of carbon tetrachloride and 0.4 ml. of pyridine is reacted with 175 mg. of N-bromoacetamide and a solution of 200 mg. of hydrogen fluoride in 1.6 ml. of a chloroform-tetrahydrofuran mixture in the manner of Example 17C. The resultant product is isolated in the described manner and crystallized from methylene chloride-hexane to give 9α,17α-dibromo-11β,21-difluoroprogesterone.

EXAMPLE 31

*6α,21-difluoro-9α,11β-dichloroprogesterone*

The requisite intermediate, 6α,21-difluoro-4,9(11)-pregnadiene-3,20-dione is prepared from 6α-fluoro-11β,21-dihydroxyprogesterone according to procedures described in copending application of Reimann and Gould, U.S. Serial No. 817,053, filed June 1, 1959.

One gram of 6α,21-difluoro-4,9(11)-pregnadiene-3,20-dione dissolved in 40 ml. of carbon tetrachloride and 1 ml. of pyridine is reacted with a solution of 224 mg. of chlorine in 2.24 ml. of carbon tetrachloride at −20° C. in the manner of Example 1. The resultant product is isolated in the described manner and recrystallized from acetone-hexane to give 6α,21-difluoro-9α,11β-dichloroprogesterone.

EXAMPLE 32

*6α-methyl-9α-iodo-11β-chloro-17α-hydroxyprogesterone 17-caproate*

The requisite intermediate, 6α-methyl-17α-hydroxy-4,9(11)-pregnadiene-3,20-dione 17-caproate is prepared from 6α-methylhydrocortisone 21-acetate (6α-methyl-11β,17α,21-trihydroxy-4-pregnene-3,20-dione 21-acetate) according to procedures described in copending application of Reimann and Gould, U.S. Serial No. 817,054, filed June 1, 1959.

A solution of 500 mg. of 6α-methyl-17α-hydroxy-4,9(11)-pregnadiene-3,20-dione 17-caproate in 20 ml. of carbon tetrachloride and 0.4 ml. of pyridine is reacted with 290 mg. of N-iodosuccinimide and a solution of 47 mg. of hydrogen chloride in 0.47 ml. of a mixture of tetrahydrofuran and chloroform in the manner described in Example 25B. The resultant product is isolated in the described manner and crystallized from acetone-hexane to give 6α-methyl-9α-iodo-11β-chloro-17α-hydroxyprogesterone 17-caproate.

EXAMPLE 33

*6β-fluoro-9α,11β-dichloro-17α-hydroxy-19-norprogesterone 17-acetate*

The requisite intermediate, 6β-fluoro-17α-hydroxy-19-nor-4,9(11)-pregnadiene-3,20-dione 17-acetate is prepared from 6β-fluoro-17α-hydroxy-19-norprogesterone 17-acetate according to procedures described in copending application of Reimann and Gould, U.S. Serial No. 817,054, filed June 1, 1959.

One gram of 6β-fluoro-17α-hydroxy-19-nor-4,9(11)-pregnadiene-3,20-dione 17-acetate dissolved in 30 ml. of carbon tetrachloride and 0.5 ml. of pyridine is reacted with 190 mg. of chlorine gas in 2.5 ml. of carbon tetrachloride at −20° C. in the manner of Example 1. The resultant product is isolated in the described manner and crystallized from acetone-hexane to give 6β-fluoro-9α,11β-dichloro-17α-hydroxy-19-norprogesterone 17-acetate.

EXAMPLE 34

*6α-methyl-9α,17α-dibromo-11β-fluoroprogesterone*

The requisite intermediate, 6α-methyl-17α-bromo-4,9(11)-pregnadiene-3,20-dione is prepared from 17α-bromoprogesterone according to procedures described in copending application of Reimann and Gould, U.S. Serial No. 817,054, filed June 1, 1959.

To a solution of 1 g. of 6α-methyl-17α-bromo-4,9(11)-pregnadiene-3,20-dione in 40 ml. of carbon tetrachloride and 0.8 ml. of pyridine is reacted with 350 mg. of N-bromoacetamide and a solution of 980 mg. of hydrogen fluoride in 7.8 ml. of chloroform-tetrahydrofuran mixture in the manner described in Example 17C. The resultant product is isolated and purified in the described manner to give 6α-methyl-9α,17α-dibromo-11β-fluoroprogesterone.

EXAMPLE 35

*6α-methyl-9α,11β-dichloro-21-fluoro-17α-hydroxyprogesterone*

The requisite intermediate, 6α-methyl-17α-hydroxy-21-fluoro-4,9(11)-pregnadiene-3,20-dione is prepared from 6α-methylhydrocortisone 21-acetate according to procedures described in copending application of Reimann and Gould, U.S. Serial No. 817,055, filed June 1, 1959.

In the manner described in Example 10, 1 g. of 6α-methyl-17α-hydroxy-21-fluoro-4,9(11)-pregnadiene-3,20-dione in 30 ml. of carbon tetrachloride and 1 ml. of pyridine is reacted with 217 mg. of chlorine gas in 2.17 ml. of carbon tetrachloride and the resultant product isolated and purified to give 6α-methyl-9α,11β-dichloro-21-fluoro-17α-hydroxyprogesterone.

EXAMPLE 36

*6α,21-difluoro-9α-bromo-11β-chloro-17α-methylprogesterone*

The requisite intermediate, 6α,21-difluoro-17α-methyl-4,9(11)-pregnadiene-3,20-dione is prepared from 17α-methylprogesterone according to procedures described in copending application of Reimann and Gould, U.S. Serial No. 817,055, filed June 1, 1959.

A solution of 1g. of 6α,21-difluoro-17α-methyl-4,9(11)-pregnadiene-3,20-dione in 50 ml. of carbon tetrachloride and 0.8 ml. of pyridine is reacted with 390 mg. of N-bromoacetamide and a solution of 110 mg. of hydrogen chloride and 1.1 ml. of tetrahydrofuran at −20° C. according to the procedure of Example 18C. The resultant product is isolated and purified in the described manner to give 6α,21-difluoro-9α-bromo-11β-chloro-17α-methylprogesterone.

EXAMPLE 37

*6α,21-difluoro-9α,11β-dichloro-17α-bromoprogesterone*

The requisite intermediate, 6α,21-difluoro-17α-bromo-4,9(11)-pregnadiene-3,20-dione is prepared from 17α-bromoprogesterone according to procedures described in copending application of Reimann and Gould, U.S. Serial No. 817,055, filed June 1, 1959.

One gram of 6α,21-difluoro-17α-bromo-4,9(11)-pregnadiene-3,20-dione and 785 mg. of p-iodotoluene dichloride are dissolved in 25 ml. of methylene chloride and 0.5 ml. of pyridine. The solution is stirred at room temperature for 5 hours, then concentrated in vacuo to a residue which is crystallized from acetone-hexane to give 6α,21-difluoro-9α,11β-dichloro-17α-bromoprogresterone.

EXAMPLE 38

*9α-bromo-11β-chloro-1,4-pregnadiene-17α,21-diol-3,20-dione 21-acetate*

To a solution of 1.0 g. of 1,4,9(11)-pregnatriene-17α,21-diol-3,20-dione 21-acetate in 40 ml. of carbon tetrachloride and 1 ml. of pyridine is added 0.395 g. of N-bromoacetamide, followed by 0.104 g. of anhydrous hydrogen chloride dissolved in 1 ml. of tetrahydrofuran. The reaction mixture is stirred at room temperature for 2 hours, and poured into icewater. The mixture is diluted with methylene chloride and the layers separated. The organic layer is washed with dilute hydrochloric acid and water, then dried over magnesium sulfate and filtered. The filtrate is concentrated in vacuo to a solid residue (1.23 g.) which is recrystallized from acetone-hexane to give 9α-bromo-11β-chloro-1,4-pregnadiene-17α,21-diol-3, 20-dione 21-acetate, M.P. 190–195° C. (dec.) $[\alpha]_D^{20}+$ 172° (dioxane)

$$\lambda_{max.}^{MeOH}\ 239\ m\mu,\ \epsilon = 14{,}500$$

*Analysis.*—Calcd. for $C_{23}H_{28}O_5ClBr$: C, 55.26; H, 5.65; Cl, 7.09; Br, 15.99. Found: C, 55.28; H, 5.34; Cl, 7.01; Br, 15.60.

EXAMPLE 39

*9α,11β-dichloro-1,4-pregnadiene-17α,21-diol-3,20-dione 21-acetate*

To a solution of 1.0 g. of 1,4,9(11)-pregnatriene-17α, 21-diol-3,20-dione 21-acetate in 40 ml. of carbon tetrachloride and 0.75 ml. of pyridine is added 0.410 g. of N-chlorosuccinimide, followed by 0.104 g. of anhydrous hydrogen chloride dissolved in 2.5 ml. of tetrahydrofuran. The reaction mixture is stirred at room temperature for 1 hour and poured into ice-water. The mixture is diluted with methylene chloride and the layers separated. The organic layer is washed with dilute hydrochloric acid, then water and is dried over magnesium sulfate and filtered. The organic filtrate is concentrated in vacuo to a solid residue which is recrystallized from acetone-hexane to give substantially pure 9α,11β-dichloro-1,4-pregnadiene-17α,21-diol-3,20-dione 21-acetate, M.P. 246–253° C. (dec.) $[\alpha]_D^{25}+162°$ (dioxane)

$$\lambda_{max.}^{MeOH}\ 237\ m\mu,\ \epsilon = 15{,}000$$

*Analysis.*—Calcd. for $C_{23}H_{28}O_5Cl_2$: C, 60.66; H, 6.20; Cl, 15.57. Found: C, 60.24; H, 6.14; Cl, 15.99.

EXAMPLE 40

*9α,11β-dichloro-1,4-pregnadiene-17α,21-diol-3,20-dione*

A. 1,4,9(11)-PREGNATRIENE-17α,21-DIOL-3,20-DIONE

A solution of 2.0 g. of 1,4,9(11)-pregnatriene-17α,21-diol-3,20-dione 21-acetate in 100 ml. of a 3:1 methanol-chloroform mixture is chilled in ice, to which is added dropwise 52 ml. of 0.1 N-sodium hydroxide solution (1 equivalent). The reaction mixture is stirred at 0° C. for 10 minutes, then diluted with water and extracted with methylene chloride. Evaporation of the solvent and crystallization of the residue from acetone-hexane affords 1,4,9(11)-pregnatriene-17α,21-diol-3,20-dione, M.P. 220–228° C. (dec.)

$$\lambda_{max.}^{MeOH}\ 238\ m\mu,\ \epsilon = 15{,}500$$

*Analysis.*—Calcd. for $C_{21}H_{26}O_4$: C, 73.66; H, 7.66. Found: C, 73.58; H, 7.54.

B. 9α,11β-DICHLORO-1,4-PREGNADIENE-17α,21-DIOL-3,20-DIONE

One gram of 1,4,9(11)-pregnatriene-17α,21-diol-3,20-dione (prepared as described in Example 40A) is dissolved in 30 ml. of carbon tetrachloride and 0.6 ml. of pyridine and there is added at —20° C. a solution of 210 mg. of chlorine in 3.5 ml. of carbon tetrachloride. The mixture is stirred at —20° C. for 15 minutes, then allowed to warm to room temperature over a period of ½ hour. The solution is filtered, and the filtrate concentrated in vacuo to a residue which is crystallized from acetone to give 9α,11β-dichloro-1,4-pregnadiene-17α,21-diol-3,20-dione, M.P. 238–241° C. (dec.) $[\alpha]_D^{20}+134°$ (pyridine), $$\lambda_{max.}^{MeOH}\ 237\ m\mu,\ \epsilon = 15{,}400$$

*Analysis.*—Calcd. for $C_{21}H_{26}O_4Cl_2$: C, 61.02; H, 6.34; Cl, 17.15. Found: C, 61.26; H, 6.30; Cl, 16.66.

EXAMPLE 41

*9α,11β-dichloro-1,4-pregnadiene-17α,21-diol,3,20-dione 21-carbethoxylate*

A. 1,4,9(11)-PREGNATRIENE-17α,21-DIOL-3,20-DIONE 21-CARBETHOXYLATE

To one gram of 1,4,9(11)-pregnatriene-17α,21-diol-3,20-dione (the compound of Example 40A) there is added 1 ml. of ethylchlorcarbonate in 25 ml. of dry pyridine. The reaction mixture is left at room temperature for 3 hours, then is poured with stirring into ice-water. The resulting precipitate is filtered, washed with water and crystallized from acetonehexane to give 1,4,9(11)-pregnatriene-17α,21-diol-3,20-dione 21-carbethoxylate.

B. 9α,11β-DICHLORO-1,4-PREGNADIENE-17α,21-DIOL-3,20-DIONE 21-CARBETHOXYLATE

One gram of 1,4,9(11)-pregnatriene-17α,21-diol-3,20-dione 21-carbethoxylate (prepared as in Example 41A) dissolved in 40 ml. of carbon tetrachloride and 0.8 ml. of pyridine is reacted with 188 mg. of chlorine in 1.88 ml. of carbon tetrachloride in the manner of Example 40B. The resultant product is isolated in the described manner and crystallized from acetone-hexane to give 9α,11β-dichloro-1,4-pregnadiene-17α,21-diol-3,20-dione 21-carbethoxylate, M.P. 238–242° C. (dec.) $[\alpha]_D^{20}+149°$ (dioxane)

$$\lambda_{max.}^{MeOH}\ 237\ m\mu\ \epsilon = 14{,}800$$

*Analysis.*—Calcd. for $C_{29}H_{30}O_6Cl_2$: C, 59:38; H, 6.23; Cl, 14.61. Found: C, 59.61; H, 6.29; Cl, 14.71.

Alternatively the compound of this example is prepared by esterifying 9α,11β-dichloro-1,4-pregnadiene-17α,21-diol-3,20-dione (the compound of Example 40B) with ethylchlorcarbonate in the manner described in Example 41A.

EXAMPLE 42

*9α,11β-dichloro-1,4-pregnadiene-17α,21-diol-3,20-dione 21-sodium-o-sulfobenzoate*

A. 1,4,9(11)-PREGNATRIENE-17α,21-DIOL-3,20-DIONE 21-SODIUM-O-SULFOBENZOATE

One gram of 1,4,9(11)-pregnatriene-17α,21-diol-3,20-dione (the compound of Example 40A) is dissolved in 25 ml. dry pyridine, then 445 mg. o-sulfobenzoic anhydride is added. The reaction mixture is stirred overnight at room temperature, then poured into ice-water, acidified with cold dilute sulfuric acid, and extracted with methylene chloride. The combined organic extracts are evaporated to a residue which, after being dissolved in aqueous methanol, is brought to neutrality with dilute aqueous sodium hydroxide. The neutral solution is then distilled to dryness, and the resultant residue extracted with water. The aqueous extracts, in turn, are concentrated to a residue which is crystallized from acetonitrile-water to yield 1,4,9(11)-pregnatriene-17α,21-diol-3,20-dione 21-sodium-o-sulfobenzoate.

B. 9α,11β-DICHLORO-1,4-PREGNADIENE-17α,21-DIOL-3,20-DIONE 21-SODIUM-O-SULFOBENZOATE

One gram of 1,4,9(11)-pregnatriene-17α,21-diol-3,20-dione 21-sodium o-sulfobenzoate (the compound of Example 42A) dissolved in 50 ml. of carbon tetrachloride is reacted with a solution of 143 mg. of chlorine in 1.43 ml. carbon tetrachloride in the presence of 0.8 ml. of dry pyridine according to the procedure of Example 40B. The resultant product is isolated in the described manner and crystallized from acetonitrile-water to give 9α,11β-dichloro-1,4-pregnadiene-17α,21-diol-3,20-dione 21-sodium-o-sulfobenzoate, M.P. 252–254° C. (dec.)

$$\lambda_{max.}^{MeOH}\ 235\ m\mu,\ \epsilon = 15{,}000$$

EXAMPLE 43

*9α,11β-dibromo-1,4-pregnadiene-17α,21-diol-3,20-dione 21-acetate*

To a solution of 1.0 g. of 1,4,9(11)-pregnatriene-17α,21-diol-3,20-dione 21-acetate in 40 ml. of methylene chloride and 0.8 ml. of dry pyridine there is added dropwise at 0° C. a solution of 420 mg. of bromine in 5 ml. of methylene chloride. The reaction mixture is stirred at 0° C. for 1 hour, then diluted with methylene chloride, washed with dilute hydrochloric acid, then with water, dried over anhydrous magnesium sulfate, and concentrated in vacuo. The residual oil is dissolved in acetone, treated with declorizing carbon and crystallized from acetone-hexane, yielding 9α,11β-dibromo-1,4-pregnadiene-17α,21-diol-3,20-dione 21-acetate, M.P. 142–146° C. (dec.) $[α]_D^{20}+185°$ (dioxane)

$$λ_{max.}^{MeOH} \; 240 \; mμ, \; ε=14,200$$

*Analysis.*—Calcd. for $C_{23}H_{28}O_5Br_2$: C, 50.75; H, 5:18; Br, 29.37. Found: C, 51.00; H, 5.04; Br, 28.82.

EXAMPLE 44

*9α - bromo - 11β-chloro-1,4-pregnadiene-17α,21-diol-3,20-dione*

1,4,9(11) - pregnatriene - 17α,21 - diol-3,20-dione (the compound of Example 40A) is reacted with N-bromoacetamide and hydrogen chloride in carbon tetrachloride and in the presence of pyridine according to the procedure of Example 38. The resultant product is isolated and purified in the described manner to give 9α-bromo-11β-chloro - 1,4 - pregnadiene - 17α,21 - diol - 3,20 - dione, $[α]_D^{25}+142°$ (pyridine)

$$λ_{max.}^{MeOH} \; 240 \; mμ, \; ε=13,400$$

*Analysis.*—Calcd. for $C_{21}H_{26}O_4BrCl$: C, 55.09; H, 5.73; Cl, 7.74; Br, 17.46. Found: C, 55.05; H, 5.89; Cl, 7.88; Br, 17.31.

EXAMPLE 45

*9α - iodo - 11β - fluoro - 1,4-pregnadiene-17α,21-diol-3,20 dione 21-acetate*

A solution of 500 mg. of 1,4,9(11)-pregnatriene-17α,21-diol-3,20-dione 21-acetate in 20 ml. of carbon tetrachloride and 3 ml. of pyridine is reacted with a solution of 270 mg. of hydrogen fluoride in 3.2 ml. of a mixture of tetrahydrofuran and chloroform and 300 mg. of N-iodosuccinimide according to the procedure of Example 14. The resultant product is isolated and purified in the described manner to give 9α-iodo-11β-fluoro-1,4-pregnadiene-17α,21-diol-3,20-dione 21-acetate, $$λ_{max.}^{MeOH} \; 240 \; mμ$$

EXAMPLE 46

*2 - methyl - 9α-chloro-11β-fluoro-4-pregnene-17α,21-diol-3,20-dione 21-acetate*

A. 2-METHYL-4,9(11)-PREGNADIENE-17α,21-DIOL-3,20-DIONE 21 ACETATE

Five grams of 2-methylhydrocortisone 21-acetate are dissolved in 20 ml. of dry dimethylformamide and 4 ml. of dry pyridine. The solution is chilled in an ice bath and to it is added dropwise 3.05 g. of methanesulfonylchloride which has been diluted to 30 ml. of dimethylformamide. After the addition has been completed, stirring is continued at room temperature for 48 hours. The reaction mixture is then poured into cold dilute sulfuric acid, and the precipitated substance is filtered, air-dried, and crystallized from acetone-methanol to yield 2-methyl-4,9(11)-pregnadiene-17α,21-diol-3,20-dione 21-acetate, $$λ_{max.}^{MeOH} \; 239 \; mμ$$

B. 2-METHYL-9α-CHLORO-11β-FLUORO-4-PREGNENE-17α,21-DIOL-3,20-DIONE 21-ACETATE

2 - methyl-4,9(11)-pregnadiene-17α,21-diol-3,20-dione 21-acetate (1 g.) prepared as in above Example 46A, is reacted with N-chlorosuccinimide (0.34 g.) and hydrogen fluoride (500 mg.) in the presence of pyridine (3 ml.) in the manner of Example 29. The resultant product is isolated in the described manner and crystallized from acetone-hexane to give 2-methyl-9α-chloro-11β-fluoro-4-pregnene-17α,21-diol-3,20-dione 21-acetate, $$λ_{max.}^{MeOH} \; 238 \; mμ$$

EXAMPLE 47

*9α,11β-dichloro-16α-ethyl-4-pregnene-17α,21-diol-3,20-dione 21-acetate*

A. 16α-ETHYL-4,9(11)-PREGNADIENE-17α,21-DIOL-3,20-DIONE 21-ACETATE

The requisite intermediate, 16α-ethyl-4-pregnene-11β,17α,21-triol-3,20-dione is prepared from 16-pregnene-3α-ol-11,20-dione in the manner described in copending application Serial No. 733,843 of Richard Rausser et al., filed May 8, 1958. The corresponding 21-acetate is formed by dissolving the 16α-ethyl-4-pregnene-21-ol prepared above (100 mg.) in 2 ml. of pyridine containing 100 mg. of acetic anhydride and allowing the solution to stand at room temperature for one hour. The reaction mixture is poured into ice and hydrochloric acid, and a solid precipitates which is filtered and crystallized from aqueous methanol to yield 16α-ethyl-4-pregnene-11β,17α,21-triol-3,20-dione 21-acetate.

16α - ethyl-4-pregnene-11β,17α,21-triol-3,20-dione 21-acetate is reacted with methanesulfonyl chloride in pyridine in the manner described in Example 46A to yield 16α - ethyl-4,9(11)-pregnadiene-17α,21-diol-3,20-dione 21-acetate.

B. 9α,11β-DICHLORO-16α-ETHYL-4-PREGNENE-17α,21-DIOL-3,20-DIONE 21-ACETATE

16α - ethyl - 4,9(11)-pregnadiene-17α,21-diol-3,20-dione 21-acetate (the compound of Example 47A) (5 g.) and p-iodotoluene dichloride (4.2 g.) is dissolved in 100 ml. of methylene chloride and 3 ml. of dry pyridine. The solution is stirred for four hours at room temperature, then poured into water and the solvent layers separated. The organic solvent layer is washed with water, dried over magnesium sulfate, filtered and then concentrated in vacuo to a residue which is recrystallized from acetone-hexane to give 9α,11β-dichloro-16α-ethyl-4-pregnene-17α, 21-diol-3,20-dione 21-acetate (4 g.).

EXAMPLE 48

*9α-chloro-11β-fluoro-16β-methyl-1,4-pregnadiene-17α, 21-diol-3,20-dione 21-acetate*

A. 16β-METHYL-1,4,9(11)-PREGNATRIENE-17α,21-DIOL-3,20-DIONE 21-ACETATE

The requisite intermediate, 16β-methyl-1,4-pregadiene-11β,17α,21-triol-3,20-dione 21-acetate is prepared from 16-pregnene-3α-ol-11,20-dione 3-acetate in the manner described in copending application, Serial No. 673,141 of Richard Rausser et al, filed July 22, 1957.

16β-methyl-1,4-pregnadiene-11β,17α,21-triol-3,20-dione 21-acetate (5 g.) is then reacted with methanesulfonyl chloride (3.05 g.), and the resultant crude product isolated in the manner described in Example 46A. The crude product is then crystallized from methylene chloride-hexane to give 16β-methyl-1,4,9(11)-pregnatriene-17α,21-diol-3,20-dione 21-acetate, $$λ_{max.}^{MeOH} \; 238 \; mμ$$

B. 9α-CHLORO-11β-FLUORO-16β-METHYL-1,4-PREGNADIENE-17α,21-DIOL-3,20-DIONE 21-ACETATE

One gram of 16β-methyl-1,4,9(11)-pregnatriene-17α, 21-diol-3,20-dione 21-acetate (prepared as in Example 48A) is reacted with 0.34 g. of N-chlorosuccinimide and 500 mg. of hydrogen fluoride in the manner described in Example 29. The crude product which is isolated is crystallized from methylene chloride to give 9α-chloro-11β - fluoro - 16β-methyl-1,4-pregnadiene-17α,21-diol-3, 20-dione 21-acetate, $$λ_{max.}^{MeOH} \; 237 \; mμ$$

EXAMPLE 49

*9α-chloro-11β-fluoro-1,4-pregnadiene-16α,17α,21-triol-3,20-dione 16,21-diacetate*

A. 1,4,9(11)-PREGNATRIENE-16α,17α,21-TRIOL-3,20-DIONE 16α,21-DIACETATE

Five grams of 1,4-pregnadiene-11β,16α,17α,21-tetrol-3,20-dione 16,21-diacetate are reacted with 2.85 g. of methanesulfonyl chloride in dimethylformamide-pyridine and the resultant product isolated and purified in the manner described in Example 46A to give 1,4,9(11)-pregnatriene-16α,17α,21-triol-3,20-dione 16,21-diacetate, $\lambda_{max.}^{MeOH}$ 238 mμ

B. 9α-CHLORO-11β-FLUORO-1,4-PREGNADIENE-16α,17α,21-TRIOL-3,20-DIONE 16,21-DIACETATE

Five grams of 1,4,9(11)-pregnatriene-16α,17α,21-triol-3,20-dione 16,21-diacetate (prepared as described in Example 49A) is reacted with 1.52 g. of N-chlorosuccinimide and 2.3 g. of hydrogen fluoride in the presence of 30 ml. of pyridine in the manner of Example 29.

The crude product is isolated, chromatographed, and crystallized from methylene chloride-hexane in the described manner to give 9α-chloro-11β-fluoro-1,4-pregnadiene-16α,17α,21-triol-3,20-dione 16,21-diacetate.

$\lambda_{max.}^{MeOH}$ 237 mμ

EXAMPLE 50

*6α,11β,21-trifluoro-9α-chloro-16α-methyl-17α-hydroxyprogesterone*

The requisite intermediate, 6α,21-difluoro-16α-methyl-17α-hydroxy-4,9(11)-pregnadiene-3,20-dione, is prepared from 3β-hydroxy-16α-methyl-5-pregnene-20-one 3-acetate according to procedures described by Shapiro et al. in copending application, U.S. Serial No. 817,065, filed June 1, 1959.

500 mg. of 6α,21-difluoro-16α-methyl-17α-hydroxy-4,9(11)-pregnadiene-3,20-dione in 20 ml. of carbon tetrachloride and 3 ml. of pyridine is reacted with 194 mg. of N-chlorosuccinimide and 260 mg. of hydrogen fluoride in the manner described in Example 11B. The resultant product is isolated in the described manner and dissolved in ether and chromatographed on silica gel. The substance eluted with 10 to 40% ether-in-hexane is crystallized from acetone-hexane to give 6α,11β,21-trifluoro-9α-chloro-16α-methyl-17α-hydroxyprogesterone.

EXAMPLE 51

*9α-chloro-11-fluoro-1,4-androstadiene-3,17-dione*

One gram of 1,4,9(11)-androstatriene-3,17-dione in 30 ml. of carbon tetrachloride and 21.6 ml. of pyridine at −25° C. is allowed to react with 710 mg. of hydrogen fluoride in 2.2 ml. of dimethylformamide and 520 mg. of N-chlorosuccinimide in the manner of Example 2. The resultant product is isolated and purified in the described manner to give 9α-chloro-11β-fluoro-1,4-androstadiene-3,17-dione.

EXAMPLE 52

*9α-chloro-11β-fluoro-1,4-androstadiene-17β-ol-3-one*

According to the procedure of Example 6B, 1 g. of 1,4,9(11)-androstatriene-17β-ol-3-one (the compound of Example 6A) in 30 ml. of carbon tetrachloride and 0.13 ml. of pyridine is allowed to react with 710 mg. of hydrogen fluoride and 520 mg. of N-chlorosuccinimide and the resultant product isolated and purified to give 9α-chloro-11β-fluoro-1,4-androstadiene-17β-ol-3-one.

EXAMPLE 53

*9α,11β-dichloro-17α-methyl-4-androstene-17-β-ol-3-one*

A solution of 1 g. of 17α-methyl-4,9(11)-androstadiene-17β-ol-3-one in 40 ml. of carbon tetrachloride and 0.8 ml. of pyridine is allowed to react with 261 mg. of chlorine in the manner of Example 1. The resultant product is isolated and purified in the described manner to give 9α,11β-dichloro-17α-methyl-4-androstene-17β-ol-3-one.

EXAMPLE 54

*9α-bromo-11β-fluoro-17α-methyl-4-androstene-17β-ol-3-one*

One gram of 17α-methyl-4,9(11)-androstadiene-17β-ol-3-one in 30 ml. of carbon tetrachloride and 4.6 ml. of pyridine is allowed to react with 506 mg. of N-bromoacetamide and 135 mg. of hydrogen fluoride according to the procedure of Example 9. The resultant product is isolated and purified in the described manner to give 9α-bromo-11β-fluoro-17α-methyl-4-androstene-17β-ol-3-one.

EXAMPLE 55

*6α-fluoro-9α,11β-dichloro-4-androstene-3,17-dione*

A. 6α-FLUORO-4,9(11)-ANDROSTADIENE-3,17-DIONE

Two grams of 6α-fluoro-4-androstene-11β-ol-3,17-dione are dissolved in 20 ml. of dimethylformamide and 2 ml. of pyridine and dehydrated with 1.5 g. of methanesulfonyl chloride in the manner of Example 3A. The resultant product is isolated and purified in the described manner to give 6α-fluoro-4,9(11)-androstadiene-3,17-dione.

B. 6α-FLUORO-9α,11β-DICHLORO-4-ANDROSTENE-3,17-DIONE

One gram of 6α-fluoro-4,9(11)-androstadiene-3,17-dione (the compound of Example 55A) in 30 ml. of carbon tetrachloride and 0.8 ml. of pyridine is allowed to react with 434 mg. of N-chlorosuccinimide and 140 mg. of hydrogen chloride in 1.4 ml. of tetrahydrofuran according to the procedure of Example 7. The resultant product is isolated and purified in the described manner to give 6α-fluoro-9α,11β-dichloro-4-androstene-3,17-dione.

EXAMPLE 56

*9α-bromo-11β-fluoro-1,4-androstadiene-3,17-dione*

One gram of 1,4,9(11)-androstatriene-3,17-dione in 30 ml. of carbon tetrachloride and 4.6 ml. of pyridine is allowed to react with 135 mg. of hydrogen fluoride in 5 ml. of a chloroform-tetrahydrofuran solution (1:2) and 535 mg. of N-bromoacetamide according to the procedure of Example 9. The resultant product is isolated in the described manner and crystallized from acetone-hexane to give 9α-bromo-11β-fluoro-1,4-androstadiene-3,17-dione, M.P. 194–196° C. dec., [α]$_D$+118° (dioxane), $\lambda_{max.}^{MeOH}$ 239 mμ (14,000)

Analysis.—Calcd. for $C_{19}H_{22}O_2BrF$: C, 59.84; H, 5.82; Br, 20.96; F, 4.98. Found: C, 60.00; H, 5.94; Br, 20.92; F, 4.32.

I claim:

1. A process for the halogenation of a 3-keto-Δ$^{9(11)}$-dehydro steroid of the pregnane and androstane series, which comprises treating a steroid of the group consisting of the 3-keto-9(11)-dehydro pregnanes and 3-keto-9(11)-dehydroandrostanes with a halogenating agent providing an electron-deficient halogen ion and an electron-rich halogen ion, the combined atomic weights of said ions being greater than 38 and less than 253; in a halogenated hydrocarbon solvent containing a tertiary amine.

2. The process according to claim 1, wherein at least one mole of a tertiary amine per mole of negative halogen donor in said halogenating agent is present in said halogenated hydrocarbon solvent.

3. The process according to claim 1, wherein said hydrocarbon solvent contains from substantially 0.1 mole to 80 moles of a tertiary amine per mole of steroid.

4. The process according to claim 3, wherein the tertiary amine is an aromatic tertiary amine.

5. The process according to claim 4, wherein the aromatic tertiary amine is pyridine.

6. The process of preparing 3-keto-9α-X-11β-Y-17β-hydroxyandrostanes, wherein X is a halogen of atomic weight greater than 19 and Y is a halogen of atomic weight less than 126 and being at least as electronegative as X which comprises reacting a 3-keto-17β-hydroxy-9(11)-dehydroandrostane with an N-haloamide in admixture with a hydrogen halide, the halogen in the halide being at least as electronegative as the halogen in the N-haloamide, and the combined molecular weight of said halogens being greater than 38 and less than 253; in a halogenated hydrocarbon solvent to which has been added at least one mole of a tertiary amine per mole of negative halogen donor in said halogenating agent.

7. The process of preparing compounds of the group consisting of 3-keto-9α,11β-dichloroandrostanes and 3-keto-9α,11β-dichloropregnanes which comprises reacting a compound of the group consisting of 3-keto-9(11)-dehydroandrostanes and 3-keto-9(11)-dehydropregnanes with N-chlorosuccinimide and hydrogen chloride in a halogenated hydrocarbon solvent to which has been added at least one mole of a tertiary amine per mole of N-chlorosuccinimide.

8. The process of preparing compounds of the group consisting of 3-keto-9α,11β-dichloroandrostanes and 3-keto-9α,11β-dichloropregnanes which comprises reacting a compound of the group consisting of 3-keto-9(11)-dehydroandrostanes and 3-keto-9(11)-dehydropregnanes with chlorine in a halogenated hydrocarbon solvent to which has been added substantially one mole of a tertiary amine per mole of chlorine.

9. The process of preparing 3-keto-9α,11β-dichloro-17β-hydroxyandrostanes which comprises reacting a 3-keto-17β-hydroxy-9(11)-dehydroandrostane with N-chlorosuccinimide in admixture with hydrogen chloride in a halogenated hydrocarbon solvent to which is added substantially two moles of pyridine per mole of hydrogen chloride.

10. The process of preparing 3-keto-9α,11β-dichloro-17β-hydroxyandrostanes which comprises reacting a 3-keto-17β-hydroxy-9(11)-dehydroandrostane with chlorine in a halogenated hydrocarbon solvent to which has been added substantially one mole of pyridine per mole of chlorine.

11. The process of preparing 9α,11β-dichloro-1,4-androstadiene-17β-ol-3-one which comprises reacting 1,4,9(11)-androstatriene-17β-ol-3-one with N-chlorosuccinimide and hydrogen chloride in carbon tetrachloride to which has been added substantially two moles of pyridine per mole of hydrogen chloride.

12. The process of preparing 9α,11β-dichloro-1,4-pregnadiene-17α,21-diol-3,20-dione 21-acetate which comprises reacting 1,4,9(11)-pregnatriene-17α,21-diol-3,20-dione 21-acetate with N-chlorosuccinimide and hydrogen chloride in a halogenated hydrocarbon solvent to which has been added substantially two moles of pyridine per mole of hydrogen chloride.

13. The process of preparing 9α,11β-dichloro-1,4-pregnadiene-17α,21-diol-3,20-dione which comprises reacting 1,4,9(11)-pregnatriene-17α,21-diol-3,20-dione in a halogenated hydrocarbon solvent containing substantially one mole of pyridine per mole of chlorine.

References Cited in the file of this patent

UNITED STATES PATENTS 2,837,515    Chemerda et al. _____ June 3, 1958

OTHER REFERENCES

Ziegler et al.: J. Am. Chem. Soc., vol. 74 (October 5, 1952), pages 4891–4894.